United States Patent Office 2,772,253
Patented Nov. 27, 1956

2,772,253

TERPOLYMERS

Earl C. Chapin, Springfield, Mass., assignor to Monsanto Chemical Company, St. Louis, Mo., a corporation of Delaware No Drawing. Application August 3, 1953,
Serial No. 372,189

3 Claims. (Cl. 260—80.5)

This invention relates to a new terpolymer system. More particularly the invention relates to terpolymers of styrene or methylstyrene, acenaphthylene and acrylonitrile or methacrylonitrile.

Styrene and acrylonitrile homopolymers and copolymers of styrene with acrylonitrile have many outstanding physical and chemical properties. However, styrene homopolymers do not have a high heat distortion temperature, acrylonitrile homopolymers are extremely difficult to mold and styrene-acrylonitrile polymers tend to be brittle.

One object of this invention is to provide thermoplastic polymers having high heat distortion temperatures, excellent moldability and substantial freedom from brittleness.

Another object is to provide modified copolymers of styrene and acrylonitrile.

A further object is to provide multipolymers of styrene, acrylonitrile and acenaphthylene.

These and other objects are attained by copolymerizing styrene, o-methylstyrene, m-methylstyrene, p-methylstyrene or mixtures thereof with acenaphthylene and acrylonitrile or methacrylonitrile.

The following examples are given in illustration and are not intended as limitations on the scope of this invention. Where parts are mentioned they are parts by weight.

EXAMPLE I

Prepare three solutions as follows: (A) dissolve 3 parts of sodium octadecyl benzene sulfonate and 0.4 part of triethanolamine in 200 parts of water, (B) dissolve 2 parts of acenaphthylene and 24 parts of acrylonitrile in 74 parts of styrene, (C) dissolve 0.4 part of potassium persulfate in 30 parts of water.

Heat solution A to reflux temperature at atmospheric pressure. Add about 3 parts of solution C to the refluxing solution and then add solution B dropwise with constant agitation. At intervals of about 20 minutes add 3-part portions of solution C until all of solution B is added. Maintain the reaction medium at reflux temperature and atmospheric pressure under constant agitation throughout the reaction. About half an hour after the last addition of solution B the reaction is complete, resulting in an aqueous suspension of a particulate terpolymer. The terpolymer may be recovered by spray drying, drum drying etc. or the suspension may be coagulated and the coagulum recovered by filtration. The product is a nearly colorless homogeneous thermoplastic material having a heat distortion temperature of about 104° C. It is readily moldable by injection molding methods.

A series of terpolymers made by the process of Example I, have the heat distortion temperatures shown in Table I.

*Table I*

| Styrene | Acenaphthylene | Acrylonitrile | Heat Distortion, ° C. |
|---|---|---|---|
| 75 | 5 | 20 | 109 |
| 85 | 5 | 10 | 108 |
| 70 | 10 | 20 | 116 |
| 65 | 15 | 20 | 124 |
| 60 | 20 | 20 | 131 |

All of the terpolymers of Table I can be molded by conventional methods such as injection or compression molding.

When a terpolymer was prepared using 15 parts of styrene, 25 parts of acenaphthylene and 60 parts of acrylonitrile, a product was obtained which could not be injection molded under conditions comparable to those used for the terpolymers in Table I. The product could be compression molded and the molded articles had extremely high heat distortion temperature.

The essential components of the terpolymers are styrene, acrylonitrile, and acenaphthylene. The styrene may be replaced in whole or in part by o-, m-, or p-methylstyrenes or mixtures thereof. It may constitute from 2 to 96 parts by weight of the terpolymer. A particularly advantageous material may be prepared using a mixture of 65% p-methylstyrene and 35% o-methylstyrene as the styrene component.

The acrylonitrile may be replaced in whole or in part by methacrylonitrile. It may constitute from 2 to 96 parts by weight of the multipolymer. If acrylonitrile itself is used, the products become quite difficult to mold by injection processes when more than 40 parts of acrylonitrile are in the terpolymer. These terpolymers high in acrylonitrile can, however, be molded by compression processes to give hard tough heat-resistant molded articles. The terpolymers made with methacrylonitrile lose some of their hardness but gain in toughness when compared with unsubstituted acrylonitrile terpolymers.

The acenaphthlene may constitute from 2 to 50 parts of the multipolymer.

The weight ratios of each of the components of the multipolymer system will be determined by the properties desired in the final product. Acenaphthylene raises the heat distortion temperature of the product linearly in relation to the amount thereof but at the same time reduces the moldability under practical molding conditions. Above 50 parts of acenaphthylene, the products have high heat distortion temperatures but are substantially unmoldable. As little as 2 parts of acenaphthylene provides a marked increase in the heat distortion temperature.

The acrylonitrile increases the tensile and flexural strength proportionally to the amount used but also lowers the moldability of the product. However, a terpolymer containing 96 parts of acrylonitrile, 2 parts of styrene and 2 parts of acenaphthylene is still moldable. If methacrylonitrile is used to replace all or some of the acrylonitrile the products are somewhat softer and more easily molded.

The styrene component has the effect of lowering the heat distortion temperature and embrittling the resin but at the same time it increases the moldability of the product. When o-methylstyrene is used to replace part or all of the styrene, the reduction in heat distortion temperature is less marked and the increase in moldability is substantially unaffected.

The preparation of the multipolymers may be carried out by mass, solvent or emulsion polymerization methods using conventional polymerization additives including peroxy catalysts, emulsifying agents, shortstops etc. The emulsion process of the example is particularly well suited for the preparation of the multipolymers.

The multipolymers are thermoplastic resins having relatively high heat distortion temperatures, and relatively high tensile and flexural strength. They are easily molded and processed by conventional operations such as roll-milling, banburying, compression molding, injection molding, extrusion, etc. They may be compounded with conventional additives such as pigments, dyes, fillers, lubricants, etc. The molded products are particularly useful for those applications of thermoplastic materials where high heat distortion temperatures coupled with high tensile and flexural strength are of paramount importance.

What is claimed is:

1. A multipolymer comprising the copolymerization product of from 2-50 parts of acenaphthylene, from 2-96 parts of a compound taken from the group consisting of acrylonitrile and methacrylonitrile and mixtures thereof and from 2-96 parts of a compound taken from the group consisting of styrene, o-methylstyrene, m-methylstyrene, p-methylstyrene and mixtures thereof, the sum of the parts of each component equalling 100 parts.

2. A terpolymer comprising the copolymerization product of from 2-50 parts acenaphthylene, from 2-96 parts of acrylonitrile, and from 2-96 parts of styrene, the sum of the parts of each component equalling 100 parts.

3. A terpolymer comprising the copolymerization product of from 2-50 parts of acenaphthylene, from 2-40 parts of acrylonitrile, and from 2-96 parts of styrene, the sum of the parts of each component equalling 100 parts.

References Cited in the file of this patent

UNITED STATES PATENTS 2,445,181 Miller et al.      July 13, 1948